Feb. 26, 1957  J. O. WILSON  2,783,039
TRAILER HITCH SHOCK ABSORBER
Filed July 30, 1954

JOHN O. WILSON
INVENTOR.

BY
ATTORNEY

United States Patent Office 2,783,039
Patented Feb. 26, 1957

2,783,039

TRAILER HITCH SHOCK ABSORBER

John O. Wilson, Huntington Park, Calif.

Application July 30, 1954, Serial No. 446,782

4 Claims. (Cl. 267—1)

My present invention relates to shock absorbers for cushioning the operative connection between a trailer and its towing vehicle, and it relates particularly to such a shock absorber which includes relief shock absorbing mechanism for handling unusually heavy loads or shocks.

It is well known in the art to provide shock absorbing apparatus in the operative connection between a trailer and its towing vehicle, such apparatus usually being mounted on the trailer draw bar. Such prior art trailer hitch shock absorbers usually consist of a cushion of one or more springs which continually exert a spring tension or spring pressure in the connection between the trailer and the towing vehicle.

However, it has long been a problem in the art to provide such a trailer hitch shock absorber which would have adequate shock absorbing qualities under normal shock and load conditions, yet which would be able to cushion abnormally heavy shocks as well as heavy sustained loads.

It has also long been a problem in the art to provide a trailer hitch shock absorber which would be capable of cushioning normal shocks and loads, and which would not be likely to suffer permanent damage with the occurrence of abnormally heavy shocks or sustained loads.

It has also been a problem in the art to provide a trailer hitch shock absorbing mechanism capable of satisfactorily dampening oscillations set up in trailers due to the movement of fluids, live stock or the like in trailers.

It is therefore an object of my present invention to provide a shock absorber for the operative connection between a trailer and its towing vehicle which includes both main cushion springs for cushioning ordinary shocks and for handling ordinary loads, and relief springs which are automatically operatively engaged for cushioning abnormally heavy shocks and for handling abnormally heavy loads.

Another object of my present invention is to provide a shock absorber for the operative connection between a trailer and its towing vehicle which has excellent shock absorbing characteristics for both light and heavy shocks and for sustained loads which are both light and heavy.

Another object of my present invention is to provide a shock absorber for the operative connection between a trailer and its towing vehicle which is capable of dampening oscillations set up in the trailer due to the fluid nature of the trailer load, such as in tank trailers and live stock trailers.

Another object of my present invention is to provide a shock absorber for the operative connection between a trailer and its towing vehicle which will have excellent shock absorbing characteristics under all load and shock conditions, and which will not be damaged by abnormally heavy shocks or heavy sustained loads.

A further object of my present invention is to provide a shock absorber of the character described in which the connecting shaft between a trailer and its towing vehicle is cushioned by spring mechanism, and in which a safety head is provided near the rear end of the connecting shaft to prevent the connecting shaft from being pulled loose from the trailer in case of accidental disengagement of the spring mechanism.

Other objects and advantages of my present invention will be apparent from the following description and claims, the novelty of my invention consisting in the features of construction, the combinations of parts, the novel relations of the members and the relative proportioning, disposition and operation thereof, all as is more completely described herein and as is more particularly pointed out in the appended claims.

In the accompanying drawings, forming a part of my present specification:

Figure 1:
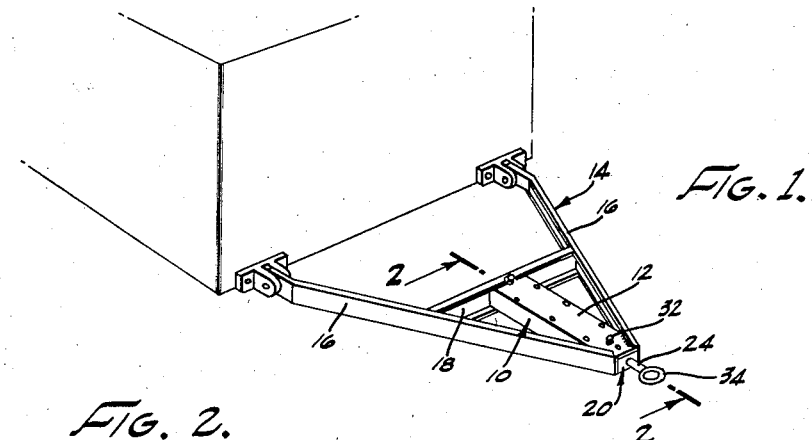
Figure 1 is a perspective view showing my invention in one of its operative positions.

Referring to my drawings, my trailer hitch shock absorber 10 is provided with a suitable housing 12 which may be attached to the trailer draw bar 14 in any suitable manner. Thus, where the trailer draw bar is of the type having converging structural members 16, my shock absorber may be mounted in the manner shown in the drawings, with the front ends of converging structural members 16 being welded or otherwise affixed to the front portion of my shock absorber, while a cross member 18 may be affixed to the rear portion of my shock absorber 10 by welding or by other suitable means.

My shock absorber 10 may be similarly associated with any other type of trailer draw bar. Thus, if the draw bar is a straight, forwardly extending shaft, my shock absorber 10 may be integrally attached to either the top or the bottom side of the draw bar, or my shock absorber 10 may be so mounted on the draw bar as to form an integral extension at the forward end of the draw bar.

If it is preferred, my trailer hitch shock absorber 10 may be mounted at the rear end of a truck or other pulling vehicle, which is advantageous where more than one trailer is likely to be hitched to the truck, and it is not desired to provide each trailer with a separate shock absorber 10.

Referring now to the specific details of my preferred trailer hitch shock absorber 10, I provide a solid nose piece 20 which extends forwardly out of the housing 12 and which is provided with outwardly extending, beveled side walls 21 to which the front ends of converging structural members 16 are welded or otherwise integrally attached.

A solid tail piece 22 is seated in the rear end of housing 12, and the rear end of housing 12 is integrally connected to the cross member 18 by welding or other suitable means.

I provide a shock absorber shaft 24, the rear portion 26 of which is reduced in diameter for reasons which will hereinafter become more fully apparent.

The front portion of shaft 24 is reciprocally mounted in an axial passage 28 through nose piece 20, and the rear portion 26 of shaft 24 is similarly reciprocally mounted in axial passage 30 through tail piece 22. Suitable grease fittings 32 are affixed to nose piece 20 and tail piece 22, and these communicate with the respective passages 28 and 30 to provide lubrication to shaft 24.

Integrally connected to shaft 24 in a central position within housing 12 is a block or flange member 36, which I prefer to affix to shaft 24 between a pair of lock nuts 38 and 40 which are threadedly engaged on the threaded portion 42 of shaft 24. I prefer to internally thread the passage through block or flange member 36 so that it can likewise be threadedly mounted on threaded portion 42 of shaft 24, in which case the lock nuts 38 and 40 will obtain their best locking engagement with block or flange member 36.

By providing the rear portion 26 of shaft 24 with a reduced diameter, the portion 42 of shaft 24 just in front of the reduced diametral portion of the shaft may be easily provided with threads, and the block or flange member 36 together with its associated lock nuts 38 and 40 may be readily operatively engaged with the threaded portion 42 of shaft 24 from the reduced diametral end portion 26 of shaft 24.

I provide a pair of helical main cushion springs 44 which are disposed directly about the shaft 24. One of my main cushion springs 44 is operatively engaged between the rear wall of nose piece 20 and the lock nut 38, while the other of my main cushion springs 44 is operatively engaged between the front wall of tail piece 22 and the lock nut 40.

Figure 2:
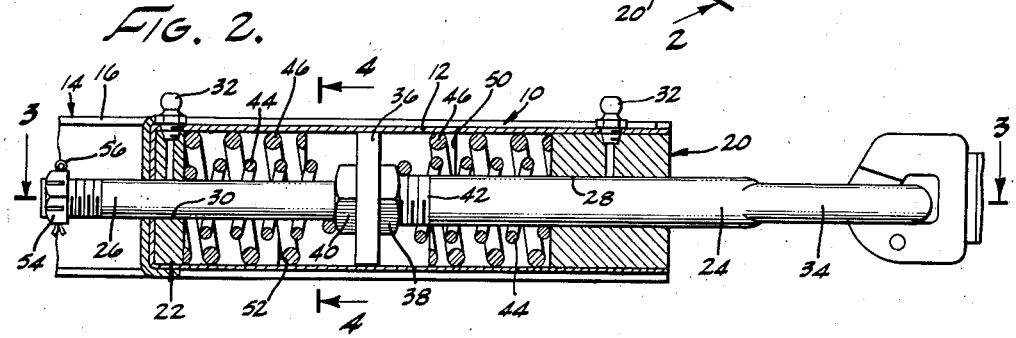
Figure 2 is a vertical section taken along the line 2—2 in Figure 1 illustrating the internal structure of my invention.
Figure 3:
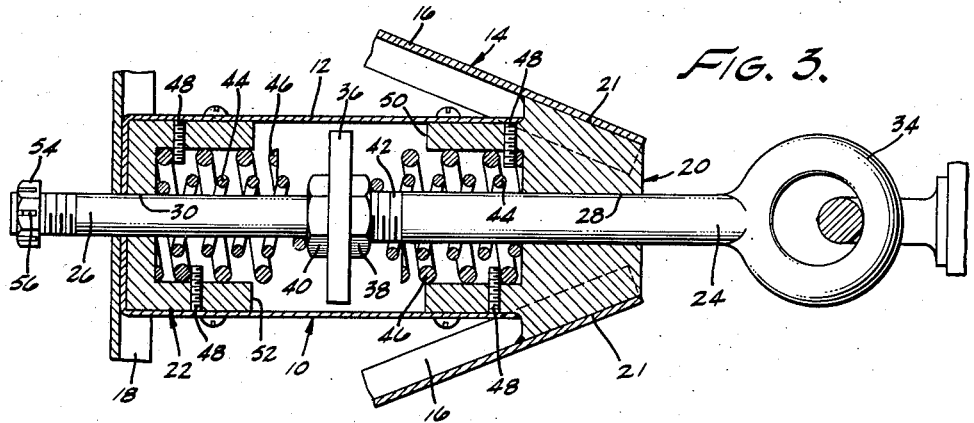
Figure 3 is a horizontal section taken along the line 3—3 in Figure 2.
Figure 4:
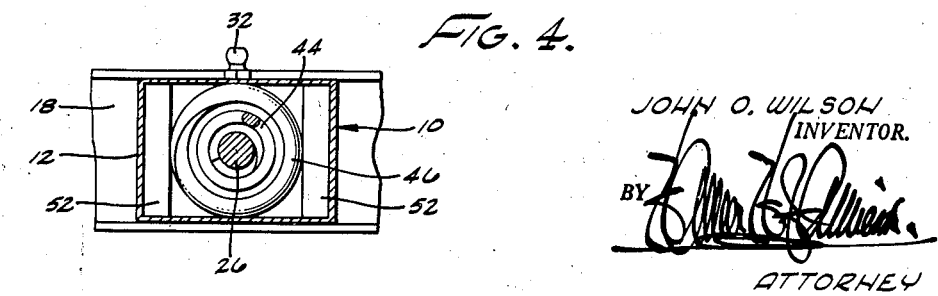
Figure 4 is a vertical section taken along the line 4—4 in Figure 2.

My main cushion springs 44 are both under compression in their rest positions as best shown in Figures 2 and 3 of the drawings, and springs 44 are sufficiently light to absorb normal road shocks such as those caused by bumps in the road or normal braking, as well as to cushion the pulling force between the towing vehicle and the trailer under normal load conditions.

In the event of a heavy shock, such as would occur upon sudden braking or the like, or if an abnormally heavy sustained load must be accommodated by my trailer hitch shock absorber, my main cushion springs 44 are insufficient to provide the required cushioning effect, so that if the cushioning were provided by main cushion springs 44 alone, the shaft 24 would slide in one or both directions to the limit of its travel, which would be likely to crush one or both of the main cushion springs 44 or to cause other permanent injury to the shock absorber, and which would also apply sudden jerks or shocks to both the trailer and the towing vehicle.

In order to accommodate abnormally heavy shocks and sustained loads I provide a pair of relief springs 46 which are concentrically mounted about the respective main cushion springs 44.

Relief springs 46 are mounted against nose piece 20 and tail piece 22, respectively, and are shorter than main springs 44 so that they are not in operative contact with the block or flange member 36 when my trailer hitch shock absorber 10 is in its rest position as shown in Figures 2 and 3 of the drawings.

Suitable retainer pins 48 associated with the side walls of nose piece 20 and tail piece 22 engage relief springs 46 to hold springs 46 in their operative positions.

The spacing between the inner ends of relief springs 46 and block or flange member 46 is sufficient to permit the main cushion springs 44 to handle ordinary shocks or loads, but upon the occurrence of any abnormally heavy shocks or when pulling abnormally heavy sustained loads, the relief springs 46 will be operatively engaged by block or flange member 36 so that regardless of which direction the shaft 24 slides from its rest position one of the main cushion springs 44 and one of the relief springs 46 will be acting upon shaft 24 to urge it back toward its rest position.

The rearwardly extending side wall portions of nose piece 20 and the forwardly extending side wall portions of tail piece 22 provide a retaining seat for holding relief springs 46 in their proper alignment with shaft 24, and the ends of these extensions provide shoulders 50 and 52, respectively, for limiting the amount of travel of shaft 24 in both directions.

Thus, during normal operation of my trailer hitch shock absorber, the main cushion springs 44 will take up the ordinary shocks and handle the usual sustained loads, while my relief springs 46 become operative to handle unusually heavy shocks and loads. However, if a shock is even heavier than those which my relief springs 46 are designed to accommodate, then block or flange member 36 will abut against the shoulders 50 or 52, as the case may be, thereby preventing further travel of shaft 24 and preventing the complete collapse of springs 44 and 46 and any injury which may result therefrom.

I provide a safety head 54 which is fixed to the rear end of shaft 24 behind cross member 18, and which will prevent shaft 24 from being drawn forward completely out of operative engagement with trailer draw bar 14 in the event of a shearing of block or flange member 36 and lock nuts 38 and 40 out of their operative positions. My preferred safety head 54 comprises a nut which is threadedly mounted on the rear end of shaft 24 and which is keyed into its operative position by means of a cotter pin 56.

My novel trailer hitch shock absorber presents several important features.

First, my shock absorber is small and compact, and is readily adaptable for mounting either on a trailer draw bar or on the rear end of a truck or other towing vehicle. If my trailer hitch shock absorber is disposed in the rear end of a truck, the benefits of my shock absorber will be present for any trailer which may be towed by that vehicle.

Another important advantage of my present invention is that it combines excellent shock absorbing qualities under normal loads and shocks with the ability to absorb abnormally heavy shocks and sustained loads.

A further important feature of my present invention is that unusually heavy loads or shocks will not cause any permanent damage to my shock absorber. This is for the reason that such heavy loads and shocks are absorbed by my relief springs 46 in combination with main cushion springs 44, so that any impact which may occur between the block or flange member 36 and the shoulders 50 or 52 will be relatively light, and will therefore not injure the shock absorber. If the shoulders 50 and 52 are not present, the use of my relief springs 46 will prevent the main cushion springs 44 from being smashed together upon any unusually heavy shocks or loads.

My present invention is also excellent for dampening oscillations which may be set up in trailers. Dangerous oscillations often occur in tank trailers which contain fluids that tend to flow back and forth upon movement of the trailer. Oscillations also tend to be set up in live stock trailers, where the stock shifts with braking, acceleration and other motions of the trailer.

Another feature of my present invention is my safety head 54 which prevents the shaft 24 from becoming detached from the mechanism, and thereby maintains the operative connection between the truck and trailer even though the shock absorber may otherwise have given out.

My trailer hitch shock absorber embodies an entirely new element in the trailer hitch shock absorber art, namely, a second set of springs 46 which operate as relief springs to cushion heavier loads and shocks than the main cushion springs 44 are capable of handling. This also causes my present invention to have an entirely new mode of operation, and produces the surprisingly new results of excellent shock absorbing characteristics over the entire range of shocks and loads.

Although I have shown and described the preferred embodiment of my invention as having main cushion springs 44 which are substantially equal both in length and in strength, and relief springs which are likewise substantially equal in length and strength, it is to be understood that if shocks or loads will predominate in one direction, the main spring 44 and the relief spring 46 on one side of block or flange member 36, or either one of them, may be either longer or stronger or both longer and stronger than those on the other side of member 36.

In my preferred embodiment my relief springs 46 are stronger than main cushion springs 44.

While my trailer hitch shock absorber may be used for shock absorbing purposes in any mechanical connection where shocks are likely to occur between the connected members, the preferred use of my shock absorber is in operative connections between a towing vehicle and a trailer. Thus, my shock absorber may be used for operatively connecting automobiles or trucks with trailer units, for inter-connecting a plurality of trailers behind a truck, for tool box, air compressor and power unit trailers, and for systems of four or five trailers such as those hauled by small tractor units in airport luggage services. My shock absorber is also beneficial for attaching any sort of farm implement or grading equipment behind a tractor.

It is to be understood that the form of my invention herein shown and described is my preferred embodiment and that various changes in the shape, size and arrangement of parts may be resorted to without departing from the spirit of my invention, or the scope of my appended claims.

I claim:

1. A shock-absorbing trailer-hitch comprising, a housing, a pair of U-shaped pieces fixed to the housing in opposed axially-spaced relationship, a shaft extending through the pieces, a member fixed on the shaft within the housing intermediate the pieces for limited axial movement between the opposed ends of the respective pieces, compression springs interposed between the bases of the respective pieces and the opposed faces of the member to dispose the member in resisted yieldable axial movement with respect to the opposed ends of the pieces, auxiliary compression springs of larger diameter and shorter length than the first-mentioned springs arranged on the pieces concentrically of the first-mentioned springs, and means for holding the auxiliary springs seated against the bases of the respective U-shaped pieces.

2. A shock-absorbing trailer-hitch comprising, a housing, a pair of U-shaped pieces fixed in opposed axially-spaced relationship in the housing, a shaft extending through the pieces beyond the respective bases thereof, the shaft being of different diameters from a median point outwardly to the opposite ends, a short section of screw threads formed on the larger portion of the shaft adjacent the smaller portion, an internally threaded member screwed onto the threaded section of the shaft, lock nuts screwed onto the threaded section of the shaft against the opposite faces of the member to adjustably fix the member on the shaft for abutting the opposed ends of the pieces to limit the axial movement of the shaft relative thereto, compression springs interposed between the bases of the respective pieces and the opposed faces of the member and to dispose the member in resisted yieldable axial movement with respect to the pieces, and auxiliary larger and stronger compression springs arranged on the respective pieces concentrically of the first-mentioned springs to supplement the resistive action of the latter.

3. A shock-absorbing trailer-hitch comprising, a housing, a pair of U-shaped pieces fixed in opposed axially-spaced relationship in the housing, a shaft extending through the pieces beyond the respective bases thereof, the shaft being of different diameters from a median point outwardly to the opposite ends, a short section of screw threads formed on the larger portion of the shaft adjacent the smaller portion, an internally threaded member screwed onto the threaded section of the shaft, lock nuts screwed onto the threaded section of the shaft against the opposite faces of the member to adjustably fix the member on the shaft for abutting the opposed ends of the pieces to limit the axial movement of the shaft relative thereto, compression springs interposed between the bases of the respective pieces and the opposed faces of the member and to dispose the member in resisted yieldable axial movement with respect to the pieces, auxiliary larger and stronger compression springs arranged on the respective pieces concentrically of the first-mentioned springs to supplement the resistive action of the latter, and a safety head secured to the inner end of the shaft to abut the innermost piece and limit forward axial movement of the shaft relative to the housing.

4. A shock-absorbing trailer-hitch comprising an A-shaped draw-bar, a rectangular housing fixed to the draw-bar between the apex and the cross part thereof, a pair of U-shaped pieces secured in the opposite ends of the housing in opposed axially spaced relationship, a shaft extending through the pieces beyond the housing ends, a member fixed on the shaft within the housing intermediate the pieces for limited axial movement between the opposed ends of the pieces, and pairs of concentrically arranged springs of differing lengths and strengths interposed between the bases of the respective pieces and the opposed faces of the member to resist the opposite axial shifting of the shaft within the limits of the abutting of the member against the opposed ends of the pieces.

References Cited in the file of this patent

UNITED STATES PATENTS

| Number | Name | Date |
|---|---|---|
| 267,082 | Howard | Nov. 7, 1882 |
| 1,232,651 | Brown | July 10, 1917 |
| 1,661,317 | Allen | Mar. 6, 1928 |
| 1,819,393 | Staley | Aug. 18, 1931 |
| 2,197,669 | Stephens | Apr. 16, 1940 |
| 2,444,305 | Milhizer | June 29, 1948 |
| 2,620,239 | Gruenais | Dec. 2, 1952 |